United States Patent
De Vega Rodrigo

(10) Patent No.: US 12,236,210 B2
(45) Date of Patent: Feb. 25, 2025

(54) SECURE MULTI-PARTY COMPUTATIONS

(71) Applicant: SEDICII INNOVATIONS LTD., Waterford (IE)

(72) Inventor: Miguel De Vega Rodrigo, Santa Cruz de Tenerife (ES)

(73) Assignee: SEDICII INNOVATIONS LTD., Waterford (IE)

( * ) Notice: Subject to any disclaimer, the term of this patent is extended or adjusted under 35 U.S.C. 154(b) by 0 days.

(21) Appl. No.: 18/710,933

(22) PCT Filed: Nov. 23, 2022

(86) PCT No.: PCT/EP2022/082986
§ 371 (c)(1),
(2) Date: May 16, 2024

(87) PCT Pub. No.: WO2023/094453
PCT Pub. Date: Jun. 1, 2023

(65) Prior Publication Data
US 2024/0329936 A1 Oct. 3, 2024

(30) Foreign Application Priority Data
Nov. 23, 2021 (EP) .................... 21210077

(51) Int. Cl.
G06F 7/58 (2006.01)
G06F 7/523 (2006.01)

(52) U.S. Cl.
CPC ............ *G06F 7/588* (2013.01); *G06F 7/523* (2013.01)

(58) Field of Classification Search
CPC ................................. G06F 7/588; G06F 7/523
See application file for complete search history.

(56) References Cited

U.S. PATENT DOCUMENTS

2019/0296896 A1* 9/2019 Resch ................ H04L 9/0656
2023/0049860 A1* 2/2023 Poorebrahim Gilkalaye ............
G06N 3/0464

OTHER PUBLICATIONS

International Search Report and Written Opinion of the International Searching Authority directed to International Patent Application No. PCT/EP2022/082986, mailed Feb. 21, 2023; 11 pages.
(Continued)

*Primary Examiner* — Michael D. Yaary
(74) *Attorney, Agent, or Firm* — Sterne, Kessler, Goldstein & Fox P.L.L.C.

(57) ABSTRACT

A secure multiparty computation method permits the computation of an arithmetic function $f$ which can be expressed as the addition of A groups of multiplications of a set S of private input secrets $\{s_0, s_1, \ldots, s_{S-1}\}$. Dealer nodes holding the secrets are provided with a base blinding factor $\rho_a$ whose inverse is the sum of a set of pseudorandom numbers each of which is associated with a respective computing node and is not shared with other computing nodes. Each dealer node is further provided with an exponent blinding factor $\lambda_{a,m}$ specific to the secret being contributed, where all of the exponent blinding factors sum to unity. The dealer nodes share with the computing nodes the product of the secrets with the base blinding factor raised to the exponent blinding factor. Each computing nodes can independently and without sharing computations, generate from the product of shares it receives from the dealer nodes a result share. Summing the result shares provides the result of the computation. In this way a sum of products can be computed by the computing nodes without requiring any messages to pass between the computing nodes during the computation.

8 Claims, 5 Drawing Sheets

(56) References Cited

OTHER PUBLICATIONS

Yao, Andrew Chi-Chih, "How to generate and exchange secrets," 27th Annual Symposium on Foundations of Computer Science (SFCS 1986), Oct. 27, 1986; pp. 162-167.
Goldreich et al., "How to play any mental game," Proceedings of the nineteenth annual ACM symposium on Theory of Computing, Jan. 1987; pp. 218-229.
Schneider et al., "GMW vs. Yao? Ecient Secure Two-Party Computation with Low Depth Circuits," Financial Cryptography, Apr. 1, 2023; pp. 1-18.
Ben-Or et al., "Completeness theorems for non-cryptographic fault-tolerant distributed computation," STOC '88: Proceedings of the twentieth annual ACM symposium on Theory of computing, Jan. 1988; pp. 1-10.
Damgard et al., "Multiparty Computation from Somewhat Homomorphic Encryption," Advances in Cryptology—CRYPTO 2012, Lecture Notes Computer Science, vol. 7417, Jan. 1, 2012; pp. 643-662.
Beaver et al., "The Round Complexity of Secure Protocols (Extended Abstract)," 22nd Annual ACM Symposium on Theory of Computing, Apr. 1, 1990; pp. 503-513.
Kolesnikov, Vladimir, "Gate Evaluation Secret Sharing and Secure One-Round Two-Party Computation," Advances in Cryptology—ASIACRYPT 2005, Lecture Notes in Computer Science, vol. 3788, Jan. 2005; pp. 136-155.
Beaver, Donald, "Efficient Multiparty Protocols Using Circuit Randomization," Advances in Cryptology—CRYPTO '91, Lecture Notes in Computer Science, vol. 576, Aug. 1991; pp. 420-432.
Lindell, Yehuda, "Secure Multiparty Computation (MPC)," Communications of the ACM, vol. 64, No. 1, Dec. 17, 2020; 15 pages.

\* cited by examiner

SECURE MULTI-PARTY COMPUTATIONS

TECHNICAL FIELD

This invention relates to Secure Multi Party Computation (SMPC) protocols.

BACKGROUND ART

Secure Multi Party Computation (SMPC) enables a set of parties to collaboratively compute a function over their inputs while keeping them private. There are several SMPC flavours described in the literature, including Yao's Garbled Circuits (Yao, Andrew Chi-Chih (1986). "How to generate and exchange secrets". 27th Annual Symposium on Foundations of Computer Science (SFCS 1986). Foundations of Computer Science, 1986., 27th Annual Symposium on. pp. 162-167. doi:10.1109/SFCS.1986.25. ISBN 978-0-8186-0740-0.), GMW (O. Goldreich, S. Micali, A. Wigderson, "How to play ANY mental game", Proceedings of the nineteenth annual ACM symposium on Theory of Computing, January 1987, Pages 218-229, doi:10.1145/28395.28420; and T. Schneider and M. Zohner, "GMW vs. Yao? Efficient secure two-party computation with low depth circuits," in Financial Cryptography and Data Security (FC'13), ser. LNCS, vol. 7859. Springer, 2013, pp. 275-292.), BGW (Ben-Or, M., Goldwasser, S., Wigderson, A.: Completeness theorems for Non-Cryptographic Fault-Tolerant Distributed Computation. In: Proc. ACM STOC '88, pp. 1-10 (1988)), SPDZ (Damgård I., Pastro V., Smart N., Zakarias S. (2012) Multiparty Computation from Somewhat Homomorphic Encryption. In: Safavi-Naini R., Canetti R. (eds) Advances in Cryptology—CRYPTO 2012. CRYPTO 2012. Lecture Notes in Computer Science, vol 7417. Springer, Berlin, Heidelberg. https://doi.org/10.1007/978-3-642-32009-5_38), BMR (Beaver, D., S. Micali, and P. Rogaway. 1990. "The Round Complexity of Secure Protocols (Extended Abstract)". In: 22nd Annual ACM Symposium on Theory of Computing. ACM Press. 503-513), and GESS (Kolesnikov, V. 2005. "Gate Evaluation Secret Sharing and Secure One-Round Two-Party Computation". In: Advances in Cryptology—ASIACRYPT 2005. Ed. by B. K. Roy. Vol. 3788. Lecture Notes in Computer Science. Springer, Heidelberg. 136-155).

There are two main constructions of SMPC: Circuit Garbling (CG) and Linear Secret Sharing (LSS). Circuit garbling requires encrypting keys in a specific order to simulate the function evaluation. Linear Secret Sharing computes shares from the inputs and distributes them among the nodes. In this disclosure we focus on SMPC flavours using LSS.

The following is a list of the main roles for the nodes participating in a SMPC computation:
  Dealer node: These nodes contribute inputs to the computation
  Computing node: These nodes perform the actual SMPC computation on the inputs provided by dealer nodes
  Result node: These nodes reconstruct the result from a finished SMPC computation
  LSS SMPC protocols comprise the following three phases:
    Phase 0 (optional)—Pre-processing: Some LSS SMPC protocols require nodes to run preliminary computations like the generation of multiplicative triplets in Beaver's version of BGW (Beaver, D. "Efficient Multiparty Protocols Using Circuit Randomization". In: Advances in Cryptology—CRYPTO'91. Ed. by J. Feigenbaum. Vol. 576. Lecture Notes in Computer Science. Springer, Heidelberg. 420-432), or in SPDZ. These computations are not related to the private inputs of any particular SMPC computation and therefore can take place in a previous offline phase.
    Phase 1—Share distribution: Each dealer node breaks down each private input to the computation into a number N of shares and sends each share to a different computing node. Each share reveals no information about the private input. It is only when all N shares from a private input are gathered that it can be reconstructed.
    Phase 2—Computation: Each computing node has one share from each private input to a computation. The computation consists of evaluating the output of a function over the private inputs. In order to do this, the computing nodes perform operations on their shares that depend on the specific function to be evaluated by the SMPC protocol.
    Phase 3—Result reconstruction: After Phase 2, each computing node has obtained a share from the result of the computation (i.e. the function to be evaluated). They send their share to one or several result nodes. After gathering all N shares from the result, a result node can reconstruct the output of the function that was jointly evaluated.

For example, assume that two dealer nodes have each one string. They would like the network of computing nodes to evaluate the result from comparing the two strings and to communicate this result to a result node. The strings are private to the dealer nodes, so they should not be sent over to the computing nodes in plaintext or in encrypted form. Each dealer node breaks down their private string into N shares and send each share to a different computing node. After receiving one share per each one of the two strings to be compared, the computing nodes follow the SMPC protocol to obtain a share of the result from the computation. This result could be a Boolean representing a string match with a TRUE value and a string mismatch with a FALSE value. Each node sends their share of the result to a result node, which reconstructs the TRUE or FALSE result from the string comparison.

The main problem with SMPC is the communication complexity. A large number of message exchanges and/or communication bandwidth is required in order for the computing nodes to collaboratively obtain in Phase 2 a share of the result of the function being evaluated when this function is complex. By complex function we mean a function with a large number of inputs and a large number of operations on those inputs. Real-world applications of SMPC typically require complex functions, which severely affects the applicability of SMPC in production scenarios.

For example, in BGW SMPC computing nodes evaluate arithmetic functions on integer inputs comprising additions and multiplications. Computing nodes running BGW can process additions without the need to exchange any message. However, the evaluation of multiplications requires the exchange of messages. Complex functions will have additions and multiplications, making the overall BGW function evaluation slow.

We refer herein to SMPC flavours evaluating arithmetic functions as SMPC in the arithmetic setting. The focus of the invention is on the evaluation with SMPC of any function in the arithmetic setting. In the arithmetic setting, a function can be represented without loss of generality as the sum of groups of secret products. In this setting, secrets are natural, integer, real or complex numbers.

The evaluation of a general function requires the computation of products in the arithmetic setting. State-of-the-art SMPCs require nodes to exchange messages in order to jointly evaluate arithmetic products. The exchange of messages is many orders of magnitude slower than computations on a local CPU. This is the reason why the jointly evaluation of nontrivial functions in standard SMPCs is orders of magnitude slower than on a centralized server.

DISCLOSURE OF THE INVENTION

A secure multiparty computation method is provided which permits the computation of an arithmetic function $f$ which can be expressed as the addition of A groups of multiplications of a set S of private input secrets $\{s_0, s_1, \ldots, s_{S-1}\}$. Dealer nodes holding the secrets are provided with a base blinding factor $\rho_a$ whose inverse is the sum of a set of pseudorandom numbers each of which is associated with a respective computing node and is not shared with other computing nodes. Each dealer node is further provided with an exponent blinding factor $\lambda_{a,m}$ specific to the secret being contributed, where all of the exponent blinding factors sum to unity. The dealer nodes share with the computing nodes the product of the secrets with the base blinding factor raised to the exponent blinding factor. Each computing nodes can independently and without sharing computations, generate from the product of shares it receives from the dealer nodes a result share. Summing the result shares provides the result of the computation. In this way a sum of products can be computed by the computing nodes without requiring any messages to pass between the computing nodes during the computation.

In one aspect there is provided a computer-implemented method, carried out between a plurality of D dealer nodes and N computing nodes, of calculating the result of an arithmetic function $f$ which can be expressed as the addition of A groups of multiplications of a set S of private input secrets $\{s_0, s_1, \ldots, s_{S-1}\}$ such that:

$$f = f(s_0, s_1, \ldots, s_{S-1}) = m_0 + m_1 + \ldots + m_{A-1} = \sum_{a=0}^{A-1} m_a$$

where each group of multiplications $m_a$, $a \in \{0, 1, \ldots, A-1\}$ is the product of $M_a$ secrets of said set S of private input secrets:

$$m_a = s_{i_{a,0}} \cdot s_{i_{a,1}} \cdot \ldots \cdot s_{i_{a,M_a-1}} = \prod_{m=0}^{M_a-1} s_{i_{a,m}}$$

and the subindices $i_{a,m}$ for $a \in \{0, 1, \ldots, A-1\}$, $m \in \{0, 1, \ldots, M_a-1\}$ identify private input secrets from the set of S secrets, and where the S secrets are selected from integers, real numbers or complex numbers, and each secret is known to one of said dealer nodes, wherein the method comprises:

a) providing each dealer node contributing a secret $s_{i_{a,m}}$ to a group of multiplications $m_a$ with a base blinding factor $\rho_a$ which is common to all secrets contributing to said group of multiplications $m_a$, wherein the base blinding factor $\rho_a$ satisfies (modulo p, where p is a prime number):

$$\rho_a^{-1} = \sum_{n=0}^{N-1} X_{n,a}$$

for a set of (N×A) random or pseudorandom numbers $X_{n,a}$ for $n \in \{0, 1, \ldots, N-1\}$, $a \in \{0, 1, \ldots, A-1\}$ each associated with a respective one of the N computing nodes;

b) providing each dealer node contributing a secret $s_{i_{a,m}}$ to a group of multiplications $m_a$ with an exponent blinding factor $\lambda_{a,m}$ which is specific to said secret $s_{i_{a,m}}$, wherein the set of exponent blinding factors $\lambda_{a,m}$ collectively satisfy (modulo p):

$$\sum_{m=0}^{M_a-1} \lambda_{a,m} = 1$$

c) storing said set of (N×A) random or pseudorandom numbers $X_{n,a}$ for $n \in \{0, 1, \ldots, N-1\}$, $a \in \{0, 1, \ldots, A-1\}$ either (i) at the computing nodes in a first mode of operation ("network mode") whereby each of the N computing nodes stores a subset of A random or pseudorandom numbers unique to that node, or (ii) at the dealer nodes in a second mode of operation ("edge mode") whereby each dealer node stores at least the subset of the (N×A) random or pseudorandom numbers $X_{n,a}$ corresponding to the additions to which that dealer contributes a secret;

d) each dealer node computing, for each secret $s_{i_{a,m}}$, one or more shares for that secret wherein in the network mode of operation a single share is computed, modulo p, as:

$$v_{a,m} = s_{i_{a,m}} \cdot \rho_a^{\lambda_{a,m}}$$

and wherein in the edge mode of operation a plurality of N shares are computed, using the N random or pseudorandom numbers $X_{n,a}$ associated with the group of multiplications $m_a$ to which the secret $s_{i_{a,m}}$ contributes, modulo p, as:

$$v_{n,a,m} = s_{i_{a,m}} \cdot \rho_a^{\lambda_{a,m}} \cdot X_{n,a}$$

e) each dealer node sending to each of the computing nodes a respective share message which, in the network mode of operation contains the same single share $v_{a,m}$, and in the edge mode of operation contains a respective one of the N shares $v_{n,a,m}$ such that each of the N computing nodes receives the shares indexed to a unique value $n \in \{0, 1, \ldots, N-1\}$;

f) each computing node calculating, for the received shares $v_{a,m}$ or $v_{n,a,m}$ associated with each group of multiplications $m_a$, a local product result which in the network mode of operation is calculated, modulo p, as:

$$r_{n,a} = X_{n,a} \cdot \prod_{m=0}^{M_a-1} v_{a,m}$$

and which in the edge mode of operation is calculated, modulo p, as:

$$r_{n,a} = \prod_{m=0}^{M_a-1} v_{n,a,m}$$

g) each computing node calculating a local addition result from the set of local product results, modulo p, as:

$$r_n = \sum_{a=0}^{A-1} r_{n,a}$$

h) computing an output of the function $f$ by combining the local addition results from the N computing nodes to compute:

$$f = f(s_0, s_1, \ldots, s_{S-1}) = \sum_{n=0}^{N-1} r_n \bmod p.$$

By providing the dealer nodes with the two different kinds of blinding factors defined above, i.e. the base blinding factors and the exponent blinding factors, the shares sent from the dealers are obfuscated in a way that perfectly hides the secrets from the computing nodes, and that also allows the computing nodes to independently each perform a computation resulting in a result share, where the result shares can be combined without knowledge of the blinding factors or the secrets to reveal the result of the computation.

The methods of the invention employ a new flavour of SMPC called NMC (Nil Message Compute) which can evaluate any function in the arithmetic setting without the computing nodes having to exchange any message during the computation phase (Phase 2). NMC therefore removes the main performance problem from standard SMPC and it is capable of evaluating nontrivial functions over a large number of private inputs and using a large number of computing nodes in essentially the same time as it takes in a centralized computation where all information is available in clear inside of a single server. NMC as presented in this invention is secure against passive adversaries who are able to corrupt up to N−1 from a total of N computing nodes. Passive adversaries by definition follow the protocol specification but try to learn information about the private inputs $s_0, s_1, \ldots, s_{S-1}$ to the computation.

The methods in their most basic form focus on the arithmetic setting and on functions returning only one number. The same methods can be readily extended to any number of output values using the techniques described in Appendix A.3 of Damgård I., Pastro V., Smart N., Zakarias S. (2012) "Multiparty Computation from Somewhat Homomorphic Encryption". In: Safavi-Naini R., Canetti R. (eds) Advances in Cryptology—CRYPTO 2012. CRYPTO 2012. Lecture Notes in Computer Science, vol 7417. Springer, Berlin, Heidelberg. https://doi.org/10.1007/978-3-642-32009-5_38. The contents of this reference are incorporated herein by reference for this purpose.

Preferably, step h) comprises:
(i) each computing node sending a local addition result $r_n$ to one or more result nodes; and
(ii) the one or more result nodes performing the summation of the received local addition results to determine the result of an arithmetic function $f$.

Preferably, step a) comprises:
(i) each computing node n, n∈ {0, 1, ..., N−1} generating a random number $X_{n,a}$;
(ii) each computing node computing a share $p_a(n+1)$ of a polynomial $p_a(x)$ of degree N−1 such that (mod p):

$$\rho_a^{-1} = p_a(0) = \sum_{n=0}^{N-1} X_{n,a}$$

(iii) each computing node sending its share of each $\rho_a^{-1}$ to each dealer node d, d∈ {0, 1, ..., D−1}; and
(iv) each dealer node reconstructing from the received shares the corresponding base blinding factor $\rho_a^{-1}$.

Preferably, step (ii) comprises:
providing a collection of random number generators $G_{n,q}$ for n, q∈ {0, ..., N−1} with n≠q, such that $G_{n,q}$ is a generator that computing nodes n and q run in sync with one another;
each computing node n generating N−1 random shares from the random number generators $G_{n,q}$ for each q∈ {0, ..., N−1}, with q≠n to generate a respective random evaluation of a polynomial $p_n(q+1)$;
each computing node n computing the coefficients of the polynomial $p_n(x)$ which satisfies each of the random evaluations $p_n(q+1)$ and satisfies $p_n(0)=X_{n,a}$;
each computing node n computing from said coefficients and $X_{n,a}$ a share $p_n(n+1)$ of the polynomial $p_n(x)$;
each computing node n generating $p_q(n+1)$ from the random number generators $G_{n,q}$ for each q∈ {0, ..., N−1}, as its own share of the polynomial $p_q(x)$ from every other computing node q;
each node computing $\sum_{q=0}^{N-1} p_q(n+1) \bmod p$ to provide a share p(n+1) of the polynomial $p_a(x)$ evaluated at n+1;
each computing node sending its share p(n+1) of $p_a(x)$ each dealer node contributing to the group of multiplications $m_a$ such that each dealer node can reconstruct the independent coefficient of $p_a(x)$ corresponding to $x^0$, which is which is equal to the sum of the secrets $$\rho_a^{-1} = \sum_{n=0}^{N-1} X_{n,a}.$$

Further preferable aspects of the method include the generation of the exponent blinding factors in a collaborative manner to satisfy the constraint $\sum_{m=0}^{M_a-1} \lambda_{a,m} = 1$. This is preferably done using the algorithm GenerateBlindingFactors described further below.

There is provided, as a further and independent aspect of invention, a method of distributing the initial shares from a secret sharing mechanism without sending any message as described below under the algorithm ZeroMessageShareDistribution. This can be applied, outside the context of the multiparty computation methods described herein, to any secret sharing mechanism that makes use of the generation of random numbers.

There is also provided, as yet a further and independent aspect of invention, a method of N nodes jointly adding N secrets and revealing the result of the sum of the secrets to one or more output nodes, while keeping the individual secrets private, as described below under the algorithm AddSecretsWithoutSendingTheirShares. It will be appreciated that this too can be applied outside the context of the multiparty computation methods described herein.

There is also provided, as yet a further and independent aspect of invention, a method of $M_a$-1 nodes jointly generating $M_a$ secret numbers $\lambda_0, \lambda_1, \ldots, \lambda_{M_a-1}$ such that their sum equals one without sharing these numbers amongst themselves, as described below under the algorithm GenerateBlindingFactors. It will be appreciated that this too can be applied outside the context of the multiparty computation methods described herein.

DETAILED DESCRIPTION OF PREFERRED EMBODIMENTS

Figure 1:
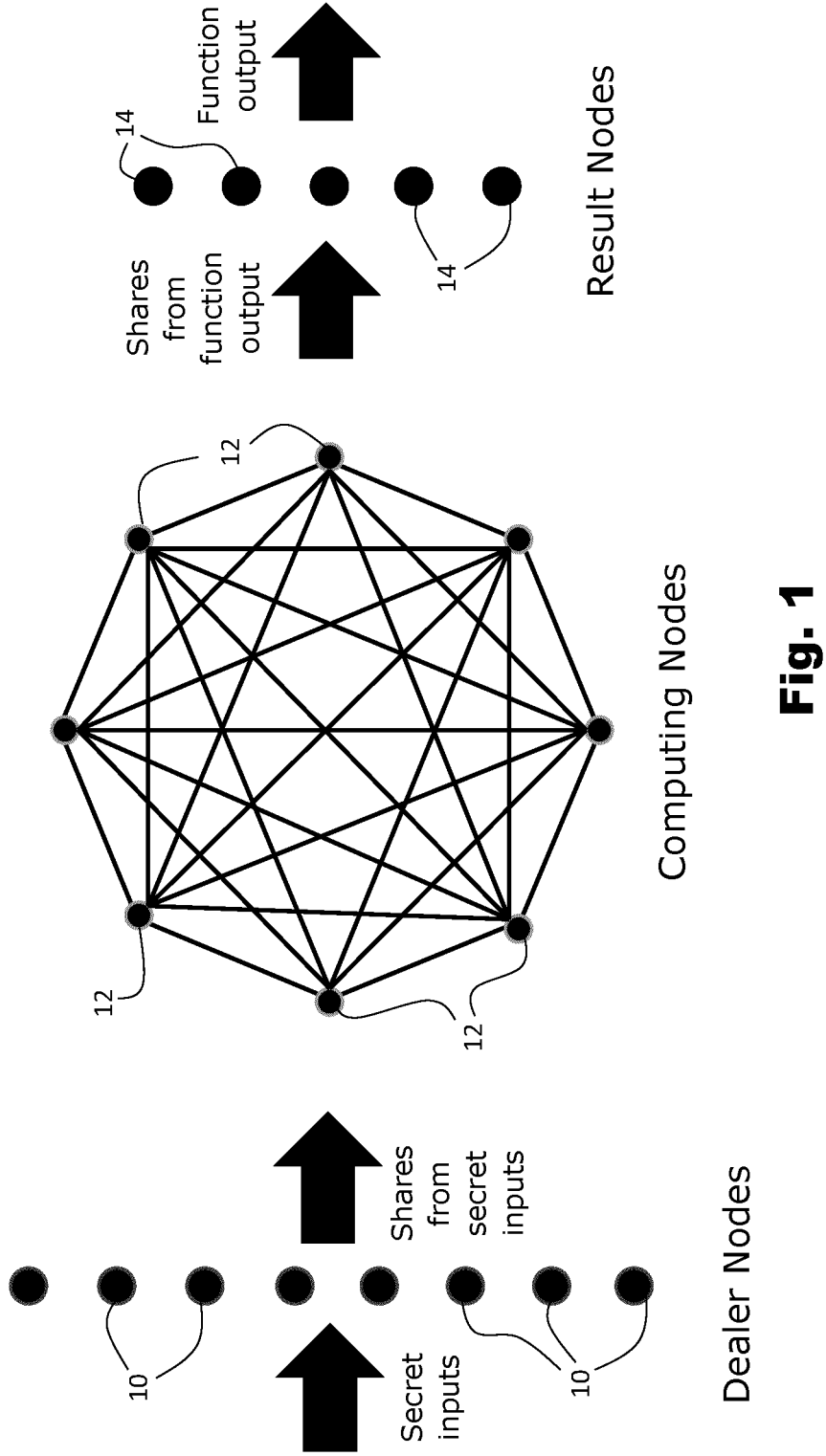
FIG. 1 is a network diagram of a conventional SMPC network of dealer nodes, computing nodes and result nodes.

FIG. 1 is a network diagram showing a plurality of nodes that co-operate to perform a secure multiparty computation (SMPC). The nodes are categorised as dealer nodes 10, computing nodes 12, and result nodes 14.

Not all of the nodes are labelled with a reference numeral but it should be understood that all nodes in the same group are of the same type i.e. all nodes in the left vertical line are dealer nodes 10, all nodes in the central octagonal group are computing nodes, and all nodes in the right vertical line are result nodes.

It should also be understood by the skilled person that the arrangement and number of nodes is not intended to represent any specific reality, and nodes are likely to be arranged into logical rather than physical groups, with nodes able to communicate with any other node via a network address on a public or private network which could be a local area network, or a wide area network. Nodes could be even part of the same computing system e.g. different processors or cores in a multiprocessor system. Communication protocols are at the choice of the system designer and are likely to be dictated by the application and security requirements of the system in which they are implemented.

Each node may be implemented in a processor of a computing system which is programmed to perform the relevant methods and algorithms disclosed herein, and further has access to a memory, and a network connection. In many implementations, each node will be a suitably programmed computer system.

The dealer nodes 10 contribute inputs to the computation. Specifically, they are provided with secret inputs, and create shares from these secret inputs and distribute them among the computing nodes 12. The computing nodes perform the actual SMPC computation and each computing node 12 provides a share of a computation output to each result node 14. The result nodes 14 reconstruct the result from the received result shares.

In what follows, we make the following assumptions:

Assumption 1: A dealer node cannot be a computing node. Otherwise, a node can have more than one role.

Assumption 2: The number of computing nodes is equal or larger than the number of dealer nodes.

Assumption 3: There are secure point-to-point channels between different nodes in the network. In addition, message broadcasting is also supported.

Assumption 4: Without loss of generality, we assume that for every addition term $m_a$ there is at most only one input per dealer, because if a dealer contributes with more than one input variable to the product $m_a$, it can always replace them with a new input variable equal to their product.

Assumption 5: Without loss of generality, we work with finite field arithmetic $Z/pZ$. That is, secrets are all represented as integers modulo p, where p is a prime number. All the computations that follow are therefore performed modulo p, represented as mod p. The arithmetic function $f$ defined in claim 1 can then be expressed more succinctly as:

$$f = f(s_0, s_1, \ldots, s_{S-1}) = \sum_{a=0}^{A-1} \prod_{m=0}^{M_a-1} s_{i_{a,m}} \mod p \qquad \text{Eq. 1}$$

Assumption 6: We are working in the semi-honest adversary model, also known as security in the presence of passive adversaries. That is, the nodes in the network may use any means to try to obtain information about the secret inputs from the messages they receive but they follow the steps described in the NMC protocol.

First, we describe below three novel algorithms which constitute building blocks for NMC. Second, we describe two flavours of NMC, one in which most of the computations corresponding to the pre-processing phase are done by the SMPC computing nodes, and one in which they are done by the dealer nodes.

Building Blocks

In this section we present three algorithms. The first one, ZeroMessageShareDistribution, is based on a novel idea that allows distributing the initial shares from a secret sharing mechanism without sending any message. The second, AddSecretsWithoutSendingTheirShares, makes use of this idea to allow computing nodes to add numbers without requiring the dealer nodes to send their shares. The third, GenerateBlindingFactors, makes use of AddSecretsWithoutSendingTheirShares in order for N nodes to come up with $M_a$ numbers $\lambda_0, \lambda_1, \ldots, \lambda_{M_a-1}$ such that $\Sigma_{m=0}^{M_a-1}\lambda_m=1$, once again without initially distributing any shares.

The general principle of algorithm ZeroMessageShareDistribution can be applied to any secret sharing mechanism that makes use of the generation of random numbers. We present this algorithm for GMW SMPC and then we show in Phase 1 of algorithm AddSecretsWithoutSendingTheirShares how it is instantiated for BGW SMPC.

1) Description of Algorithm: ZeroMessageShareDistribution for GMW SMPC

Inputs: N input nodes, whereby node n has a secret $x_n$, $n \in \{0, 1, \ldots, N-1\}$ Output: Each node ends up with a share of each other node's secret Purpose: The shares are distributed without any message exchange In GMW SMPC, each dealer n contributing with a secret bit $x_n$ generates N-1 random bits $x_{n,0}, x_{n,1}, \ldots, x_{n,n-1}$, $x_{n,n+1}, \ldots, x_{n,N-1}$ such that $x_{n,0} \oplus x_{n,1} \oplus \ldots \oplus x_{n,N-1} = x_n$ by setting $x_{n,n} = x_n \oplus (\oplus_{q \neq n} x_{n,q})$. Then, dealer n sends random number $x_{n,q}$ to Node q, for $q \neq i$. That is, each node n is sending N−1 messages. That is a total number of N(N−1) messages. Instead of sending all these messages, the dealers can use random number generators in sync as follows.

Let $G_{n,q}$ be a collection of random number generators, for n, $q \in \{0, \ldots, N-1\}$ with $n \neq q$, such that $G_{n,q}$ is a generator that nodes n and q run in sync, and which generates random bits.

That is, nodes n and q can independently obtain the same sequence of random numbers from $G_{n,q}$.

We write $g \leftarrow G_{n,q}$ to denote when a node runs the number generator $G_{n,q}$ to produce a random bit g. Each node n proceeds as follows in order to generate N shares $x_{n,0}, x_{n,1}, \ldots, x_{n,N-1}$ from their secret bit $x_n$:

Step 1—Generate (N−1) random shares. Node n uses $G_{n,q}$ for each $q \in \{0, \ldots, N-1\}$, with $q \neq n$ to generate a random share (i.e. a random bit) $x_{n,q} \leftarrow G_{n,q}$ for their secret bit $x_n$.

Step 2—Generate their own share. Node n now has N−1 shares for their secret bit $x_n$. With one more evaluation the total set of shares will be complete. Node n choses $x_{n,n} = x_n \oplus (\oplus_{q \neq n} x_{n,j})$ as their own share to their secret bit.

In step 1 above, node n uses $G_{n,q}$ to generate the random share $x_{n,q}$ from their secret bit $x_n$ that needs to be sent to node q, with $n \neq q$. However, both nodes n and q have an instance of the same random number generator $G_{n,q}$ running in sync. Therefore, node q can independently obtain $x_{n,q} \leftarrow G_{n,q}$, without any need for communication. Following this principle, every node n is able to generate their own share $x_{n,n}$ from the 2-step process described above, and their share $x_{n,q}$ from the secret bit $x_q$ from every other input node q using $x_{q,n} \leftarrow G_{q,n}$ without ever having to receive or send a single message. This constitutes the novel procedure that allows the input nodes to distribute the shares from their secret bits without exchanging any message.

This ends the description of the algorithm ZeroMessageShareDistribution.

BGW SMPC makes use of Shamir's Secret Sharing (SSS) mechanism in order for the nodes to generate shares from their secret input values to the SMPC computation. The main idea in SSS is for a node n to hide their secret $x_n \in Z/pZ$ inside a polynomial:

$$p_n(x) = x_n + a_{1,n} x + a_{2,n} x^2 + \ldots + a_{N-1,n} x^{N-1} \mod p$$

with random coefficients $a_{1,n}, a_{2,n}, \ldots, a_{N-1,n}$ such that the polynomial evaluated at x=0 is equal to the secret: $p_n(0) = x_n$. Given that N points are enough to uniquely determine a polynomial of degree N−1, the n-th dealer generates N polynomial evaluations $p_n(1), p_n(2), \ldots, p_n(N)$ at a set of predetermined abscissae x=1, 2, ..., N and sends a different evaluation to each one of the computing nodes. At the end of this process, each computing node j,j∈ {0, ..., N−1} ends up with a share $p_n(j+1)$ evaluated at its assigned abscissa x=j+1 from a polynomial $p_n(x)$,n∈ {0, ..., N−1} that hides a secret $x_n$ at $p_n(0) = x_n$.

Algorithm ZeroMessageShareDistribution can be used with any secret sharing mechanism that makes use of the generation of random numbers. Such is the case of Shamir's Secret Sharing mechanism in BGW SMPC, which works with random polynomial coefficients. We now show how this algorithm can be instantiated in the BGW SMPC case in order to allow the input nodes to send their shares from their secret inputs without any message exchange. This constitutes Phase 1 of algorithm AddSecretsWithoutSendingTheirShares. This algorithm shows how N nodes can add N secrets without disclosing them.

2) Description of Algorithm: AddSecretsWithoutSendingTheirShares

Inputs: N input nodes, whereby node n has a secret $x_n$, n∈ {0, 1, ..., N−1}

Output: One or several output nodes reconstruct the sum $\Sigma_{n=0}^{N-1} x_n \mod p$ Purpose: N nodes can jointly add N secrets and reveal the result of the sum to the output nodes whilst keeping their secrets private.

The algorithm comprises the 3 standard SMPC phases, whereby Phase 1 is an instantiation of algorithm ZeroMessageShareDistribution for Shamir's Secret Sharing mechanism. Phases 2 and 3 are the same as in the standard BGW SMPC.

Phase 1—Share Distribution

We describe the instantiation of algorithm ZeroMessageShareDistribution for Shamir's Secret Sharing mechanism.

Let $G_{n,q}$ be a collection of random number generators, for n, $q \in \{0, \ldots, N-1\}$ with $n \neq q$, such that $G_{n,q}$ is a generator that nodes n and q run in sync, and which generates random numbers in Z/pZ.

That is, nodes n and q can independently obtain the same sequence of random numbers from $G_{n,q}$. A simple implementation of $G_{n,q}$ is a cryptographic hash function that takes its output as an input to produce the next number provided that both nodes n and q start with the same initial input value. However, any pseudo-random number generator that outputs random numbers in Z/pZ will work.

We write $g \leftarrow G_{n,q}$ to denote when a node runs the number generator $G_{n,q}$. Each node n proceeds as follows in order to generate N evaluations from their polynomial $p_n(x)$:

Step 1—Generate (N−1) random shares $p_n(q+1)$, $n \neq q$. Node n uses $G_{n,q}$ for each $q \in \{0, \ldots, N-1\}$, with $q \neq n$ to generate a random evaluation of its polynomial $p_n(q+1) \leftarrow G_{n,q}$. This evaluation constitutes a share from secret $x_n$.

Step 2—Generate its own share $p_n(n+1)$. Node n now has N−1 evaluations (shares) of a polynomial of degree N−1. With one more evaluation the polynomial will be fully characterised. Node n choses $p_n(0) = x_n$ as the N-th evaluation. The polynomial $p_n(x)$ is now fully characterised but $p_n(0)$ cannot be a valid share because it is equal to the secret $x_n$. In order to obtain the missing share $p_n(n+1)$ node n performs polynomial interpolation (e.g. using Lagrange) and obtains the coefficients $a_{1,n}, \ldots, a_{N-1,n}$ of its polynomial $p_n(x) = x_n + a_{1,n} x + a_{2,n} x^2 + \ldots + a_{N-1,n} x^{N-1} \mod p$. With these coefficients and $x_n$, node n computes $p_n(n+1)$ through direct evaluation, which is their share to their own polynomial.

In step 1 above, node n uses $G_{n,q}$ to generate the random evaluation of their polynomial $p_n(q+1)$ that needs to be sent to node q, with $n \neq q$. However, both nodes n and q have an instance of the same random number generator $G_{n,q}$ running in sync. Therefore, node q can independently obtain $p_n(q+1) \leftarrow G_{n,q}$, without any need for communication. Following this principle, every node n is able to generate their own share $p_n(n+1)$ from the 2-step process described above, and their share $p_q(n+1)$ from the polynomial $p_q(x)$ from every other computing node q using $p_q(n+1) \leftarrow G_{q,n}$ without ever having to receive or send a single message. This constitutes the novel procedure that allows the computing nodes to distribute the shares from their secret without exchanging any message so that they can jointly compute their sum using BGW SMPC.

Phase 2—Computation

This part of the algorithm follows the standard BGW SMPC. Every node n now has a share $p_q(n+1)$ from a polynomial $p_q(x)$ of degree N−1 such that $p_q(0)=x_q$ is the secret from node q∈ {0, 1, . . . , N−1}, q≠n. We define the polynomial:

$$p(x) = \sum_{n=0}^{N-1} p_n(x) \bmod p$$

This is a polynomial of degree N−1 such that $p(0)=\sum_{n=0}^{N-1} x_n n \bmod p$. This is the sum of all the secrets and it constitutes the output of this algorithm. Following the standard BWG SMPC, by adding all their shares $p(n+1)=\sum_{q=0}^{N-1} p_q(n+1) \bmod p$, node n can compute their share $p(n+1)$ of $p(x)$ evaluated at n+1.

Phase 3—Result Reconstruction

Continuing with the standard BGW SMPC, each node sends their share $p(n+1)$ of $p(x)$ to one or several output nodes. When an output node has received all the shares, it performs polynomial interpolation and reconstructs the independent coefficient $a_0$ (i.e. the one that corresponds to $x^0$) which is equal to the sum of the secrets: $a_0=\sum_{n=0}^{N-1} x_n$.

This ends the description of the algorithm AddSecretsWithoutSendingTheirShares.

3) Description of Algorithm: GenerateBlindingFactors

Inputs: $M_a$-1 input nodes.

Output: $M_a$ output nodes, whereby the m-th result node, m∈ {0, 1, . . . , $M_a$-1} reconstructs the blinding factor $\lambda_m$, such that $$\sum_{m=0}^{M_a-1} \lambda_m = 1$$

Purpose: $M_a$-1 nodes jointly generate $M_a$ blinding factors $\lambda_0, \lambda_1, \ldots, \lambda M_{a-1}$ such that their sum equals one without sharing these factors amongst themselves. This algorithm allows the input nodes to reveal the m-th blinding factor $\lambda_m$ to each node m from a total of $M_a$ dealer nodes.

Step 1: Each input node m, m∈ {0, 1, . . . , $M_a$-2} generates a random number $\lambda_m$. That is, each one generates a number in the series $\lambda_0, \lambda_1, \ldots, \lambda_{M_a-2}$ (all lambdas in the sum except for the last one $\lambda_{M_a-1}$)

Step 2: Each input node m, m∈ {0, 1, . . . , $M_a$-2} runs algorithm AddSecretsWithoutSendingTheirShares using $\lambda_m$ as their secret input:

At the end of Phase 1 in algorithm AddSecretsWithoutSendingTheirShares, each input node m, m∈ {0, 1, . . . , $M_a$-2} ends up having a polynomial share $p_0(m+1)$, $p_1(m+1)$, . . . , $p_{M_a-2}(m+1)$ from each random number $\lambda_0, \lambda_1, \ldots, \lambda_{M_a-2}$, respectively At the end of Phase 2 in algorithm AddSecretsWithoutSendingTheirShares, each input node m, m∈ {0, 1, . . . , $M_a$-2} ends up having a polynomial share $p_†(m+1)$ from a polynomial $p_†(x)$ that is equal to the sum of $\lambda_0, \lambda_1, \ldots, \lambda_{M_a-2}$ when evaluated at x=0: $p_†(0)=(\sum_{m=0}^{M_a-2} \lambda_m) \bmod p$.

Each input node m calculates (mod p):

$$p_{M_a-1}(m+1) = 1 - p_†(m+1)$$

with its local share $p_†(m+1)$ of $p_†(x)$. Since Shamir Secret Sharing is linear, $p_{M_a-1}(m+1)$ turns out to be a share of a polynomial $p_{M_a-1}(x)$ hiding the value $(1-\sum_{m=0}^{M_a-2}\lambda_m) \bmod p$ when evaluated at x=0. That is, we define $\lambda_{M_a-1}$ as follows (mod p $$\lambda_{M_a-1} \triangleq = p_{M_a-1}(0) = \left(1 - \sum_{m=0}^{M_a-2} \lambda_m\right)$$

This ensures that (mod p):

$$\sum_{m=0}^{M_a-1} \lambda_m = 1 \qquad \text{Eq. 3}$$

To summarise, each input node m, m∈ {0, 1, . . . , $M_a$-2} has now a polynomial share $p_0$ (m+1), $p_1$(m+1), . . . , $p_{M_a-1}$(m+1) from $M_a$ polynomials $p_0(x)$, $p_1(x)$, . . . , $p_{M_a-1}(x)$ hiding secrets $\lambda_0, \lambda_1, \ldots, \lambda_{M_a}$-1, such that Eq. 3 holds.

At the end of Phase 3 from algorithm AddSecretsWithoutSendingTheirShares, each input node m, m∈ {0, 1, . . . , $M_a$-2} then sends each polynomial share $p_k(m+1)$ of $\lambda_k$ to the k-th output node, with k∈ {0, 1, . . . , $M_a$-1}, so that output node k can reconstruct $\lambda_k$.

This ends the description of the algorithm GenerateBlindingFactors.

NMC SMPC—Formal Definition

Recall from Eq. 1 the general form of a function in the arithmetic setting $$f = f(s_0, s_1, \ldots, s_{S-1}) = \sum_{a=0}^{A-1} \prod_{m=0}^{M_a-1} s_{i_{a,m}} \bmod p$$

We have D dealer nodes contributing secrets from the set $\{s_0, s_1, \ldots, s_{S-1}\}$ to the computation of a generic arithmetic function given by Eq. 1. This computation is carried out by N computing nodes, and the corresponding result is revealed to R result nodes. We present two flavours of the novel NMC SMPC to solve this problem:

1) Network NMC: in this flavour the bulk of the computational load in the pre-computing phase is carried out by the N computing nodes.
2) Edge NMC: in this flavour the bulk of this load is carried out by the D dealer nodes.

Instead of directly applying a linear secret sharing (LSS) schema to the secret inputs, the idea underpinning both NMC flavours is to mask the secret inputs using blinding factors and then to use LSS (such as Shamir) to store some of these factors in the network of computing. More specifically:

1) In the Network NMC the masked value v from input secret s is given by $v=s\cdot\rho^\lambda$, where Shamir shares from $\rho$ and $\lambda$ are generated and stored by the network of computing nodes
2) In the Edge NMC the masked value v from input secret s is given by $v=s\cdot X\cdot\rho^\lambda$ where Shamir shares from $\lambda$ are generated and stored by the network of computing nodes, and X and ρ are generated by the dealer nodes We now define the four phases of the Network NMC SMPC to evaluate this function.

Description of Algorithm Network NMC
Inputs: D dealer nodes, whereby the n-th node holds a subset $S_n$ of the total set of secrets $S=\{s_0, s_1, \ldots, s_{S-1}\}$. The dealer nodes wish to compute an arithmetic function $f=f(s_0, s_1, \ldots, s_{S-1})$ over their secrets given by Eq. 1

Output: R result nodes reconstruct the function result $f=\Sigma_{a=0}^{A-1}\Pi_{m=0}^{M_a-1}s_{i_{a,m}}$ mod p comprising A additions, whereby the a-th addition comprises $M_a$ multiplications. This function is computed by N computing nodes that are not able to see any of the input secrets.

Purpose: N computing nodes can jointly evaluate any arithmetic function whilst keeping the dealers' secrets private and without any message exchange during the computation phase. Algorithm Network NMC comprises four phases: Pre-processing, Share Distribution, Computation and Result Reconstruction.

Phase 0—Pre-Processing

This phase deals with the computation of a base blinding factor $\rho_a$ and $M_a$ exponent blinding factors $\lambda_{a,0}, \lambda_{a,1}, \lambda_{a,M_a-1}$ such that $\Sigma_{m=0}^{M_a-1}\lambda_{a,m}=1 \pmod{p}$, for each addition a, $a\in\{0, 1, \ldots, A-1\}$.

The following steps are executed in parallel for each addition a, $a\in\{0, 1, \ldots, A-1\}$:

Step 1 (computation of the base blinding factor):
Each computing node n, $n\in\{0, 1, \ldots, N-1\}$ generates a random number $X_{n,a}$.

Step 2 (computation of the base blinding factor):
Each computing node n runs algorithm AddSecretsWithoutSendingTheirShares, using $X_{n,a}$ as their secret input value in order to jointly calculate $\Sigma_{n=0}^{N-1} X_{n,a}$. At the end of Phase 2 in this algorithm, each node n has a share $p_a(n+1)$ of a polynomial $p_a(x)$ of degree N−1 such that (mod p):

$$p_a(0) = \sum_{n=0}^{N-1} X_{n,a}$$

We denote this by $\rho_a^{-1}=p_a(0)$, the inverse of the baseline blinding factor. In the Result Reconstruction phase of algorithm AddSecretsWithoutSendingTheirShares, each computing node sends their share of each $\rho_a^{-1}$ to each dealer node d, $d\in\{0, 1, \ldots, D-1\}$. Each dealer node is then able to reconstruct (mod p):

$$\rho_a^{-1} = \sum_{n=0}^{N-1} X_{n,a} \qquad \text{Eq. 2}$$

Step 3 (computation of the exponent blinding factors):
In parallel to the two steps presented above, the N computing nodes organise themselves in A subsets $S_0, S_1, \ldots, S_{A-1}$ of $M_0-1, M_1-1, \ldots, M_{A-1}-1$ computing nodes, respectively. For each addition a, $a\in\{0, 1, \ldots, A-1\}$, the computing nodes from the a-th subset $S_a$ work in collaboration to compute $M_a$ random values $\lambda_{a,0}, \lambda_{a,1}, \ldots, \lambda_{a,M_a-1}$ (blinding factors) such that $\Sigma_{m=0}^{M_a-1}\lambda_{a,m}=1 \pmod{p}$. They achieve this by running GenerateBlindingFactors with $S_a$ as the subset of input nodes. That is, as a result from the parallel execution of A instances of algorithm GenerateBlindingFactors, each dealer node d, $d\in\{0, 1, \ldots, D-1\}$ can reconstruct $\lambda_{a,m}$, if they participate with secret $s_{i_{a,m}}$ in the computation of the product $\Pi_{m=0}^{M_a-1}s_{i_{a,m}}$ corresponding to the a-th addition in Eq. 1, such that for every $a\in\{0, 1, \ldots, A-1\}$, $\lambda_{a,m}$ fulfils:

$$\sum_{m=0}^{M_a-1} \lambda_{a,m} = 1 \qquad \text{Eq. 3}$$

Note of the A subsets $S_0, S_1, \ldots, S_{A-1}$ of computing nodes: These subsets can be chosen according to any arbitrary method. Assumption 2 guarantees that such subsets exist. In another embodiment, the a-th subset $S_a$ of $M_a-1$ computing nodes is expanded to any arbitrary number $N_a$, $M_a-1 \leq N_a$; N of computing nodes by adding $N-(M_a-1)$ nodes, whereby the m-th added node generates $\lambda_{a,m}=0$ in Step 1 of algorithm GenerateBlindingFactors, for all $a\in\{0, 1, \ldots, A-1\}$, so that Eq. 3 is not altered.

Note on performance: The computation of $\rho_a^{-1}$ and of $\lambda_{a,m}$ for each addition a, $a\in\{0, 1, \ldots, A-1\}$ requires the execution of Phase 3 from algorithm AddSecretsWithoutSendingTheirShares. This phase comprises the transmission of messages to every dealer node. By aggregating all the messages to a dealer node in one, each computing node needs to send only one message per dealer node. This is a total number of N·D messages in the network, where D is the number of dealer nodes.

At the end of the NMC pre-processing phase, each dealer node d, $d\in\{0, 1, \ldots, D-1\}$ ends up with the blinding factors $\rho_a^{-1}$ (and hence $\rho_a$) and $\lambda_{a,m}$, $a\in\{0, 1, \ldots, A-1\}$, $m\in\{0, 1, \ldots, M_a-1\}$ for every secret $s_{i_{a,m}}$ they contribute with to the overall SMPC computation. This phase is completely independent of the secrets $s_0, s_1, \ldots, s_{S-1}$, which are the inputs to the evaluation of the arithmetic function. Therefore, it can be executed before (e.g. months) the actual evaluation of the arithmetic function running NMC SMPC and it can be processed in batch.

Phase 1—Share Distribution
Step 1: Each dealer node $d\in\{0, 1, \ldots, D-1\}$ masks their secret (mod p):

$$v_{a,m} = s_{i_{a,m}} \cdot \rho_a^{\lambda_{a,m}}$$

if they contribute with secret $s_{i_{a,m}}$ to the computation of the multiplication comprising the a-th addition term in Eq. 1. Recall that in $s_{a,m}$, $i_{a,m}$ acts as an index to the corresponding secret in the set $s_0, s_1, \ldots, s_{S-1}$. Recall also from Assumptions 3 that each dealer node only contributes with at most one secret to the a-th addition term in Eq. 1.

Step 2: Each dealer node $d\in\{0, 1, \ldots, D-1\}$ sends one broadcast message to the N computing nodes containing one value $v_{a,m}$ for each addition term a to which they contribute a secret. Each value $v_{a,m}$ represents a NMC share their secret $s_{i_{a,m}}$.

Note on security. Notice that the N computing nodes do not know the value of the base blinding factor $\rho_a$ or of the exponent blinding factors $\lambda_{a,m}$, because all they have is a polynomial share of these values. Therefore, the factor $\rho_a^{\lambda_{a,m}}$ is effectively hiding the secret value $s_{i_{a,m}}$ and algorithm NMC inherits the security features from SSS, namely, it is secure against N−1 (or less) colluding nodes in the passive adversary model. Specifically, an adversary would have to corrupt all N computing nodes in order to be able to reconstruct $\rho_a$ and $\lambda_{a,m}$ in order to recover $s_{i_{a,m}}$ from $v_{a,m}$.

Phase 2—Computation

Step 1: Each computing node n, $n \in \{0, 1, \ldots, N-1\}$ calculates for each addition a, $a \in \{0, 1, \ldots, A-1\}$ (mod p):

$$r_{n,a} = X_{n,a} \cdot \prod_{m=0}^{M_a-1} v_{a,m} \qquad \text{Eq. 4}$$

Step 2: Each computing node n, $n \in \{0, 1, \ldots, N-1\}$ calculates (mod p):

$$r_n = \sum_{a=0}^{A-1} r_{n,a} \qquad \text{Eq. 5}$$

This phase does not require any communication between the computing nodes since each node n can locally compute $r_{n,a}$ for each $a \in \{0, 1, \ldots, A-1\}$.

Phase 3—Result Reconstruction

Each computing node n, $n \in \{0, 1, \ldots, N-1\}$ sends their NMC share $r_n$ of the result to the result nodes, which compute:

$$f = f(s_0, s_1, \ldots, s_{S-1}) = \sum_{n=0}^{N-1} r_n \bmod p \qquad \text{Eq. 6}$$

This ends the description of the algorithm Network NMC.

Figure 2:
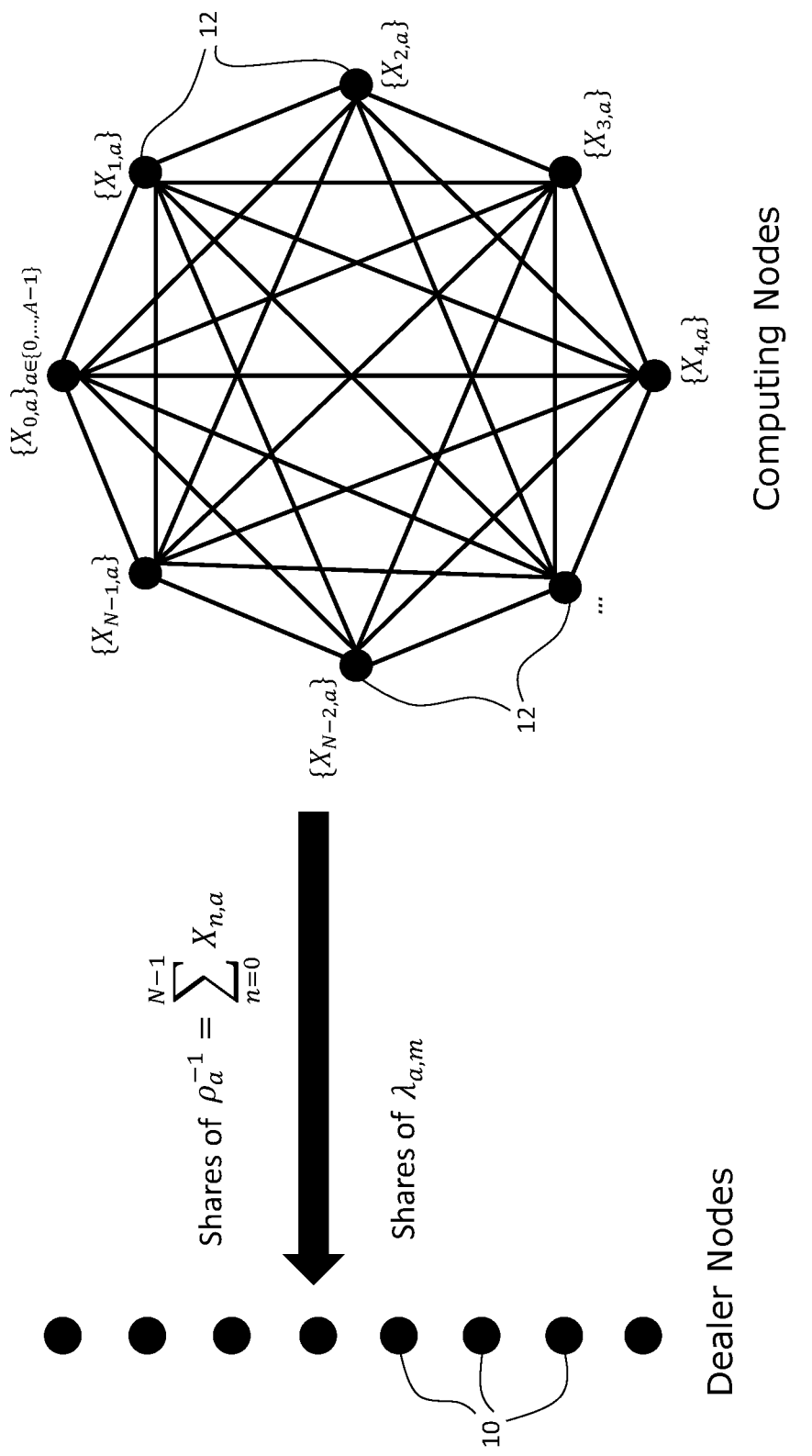
FIG. 2 is a network diagram of the computing nodes and dealer nodes of FIG. 1 implementing the Network NMC algorithm disclosed herein.

FIG. 2 shows the computing nodes 12 and the dealer nodes 10 from FIG. 1, carrying out the steps of Phase 0—Pre-processing for the Network NMC implementation.

Figure 3:
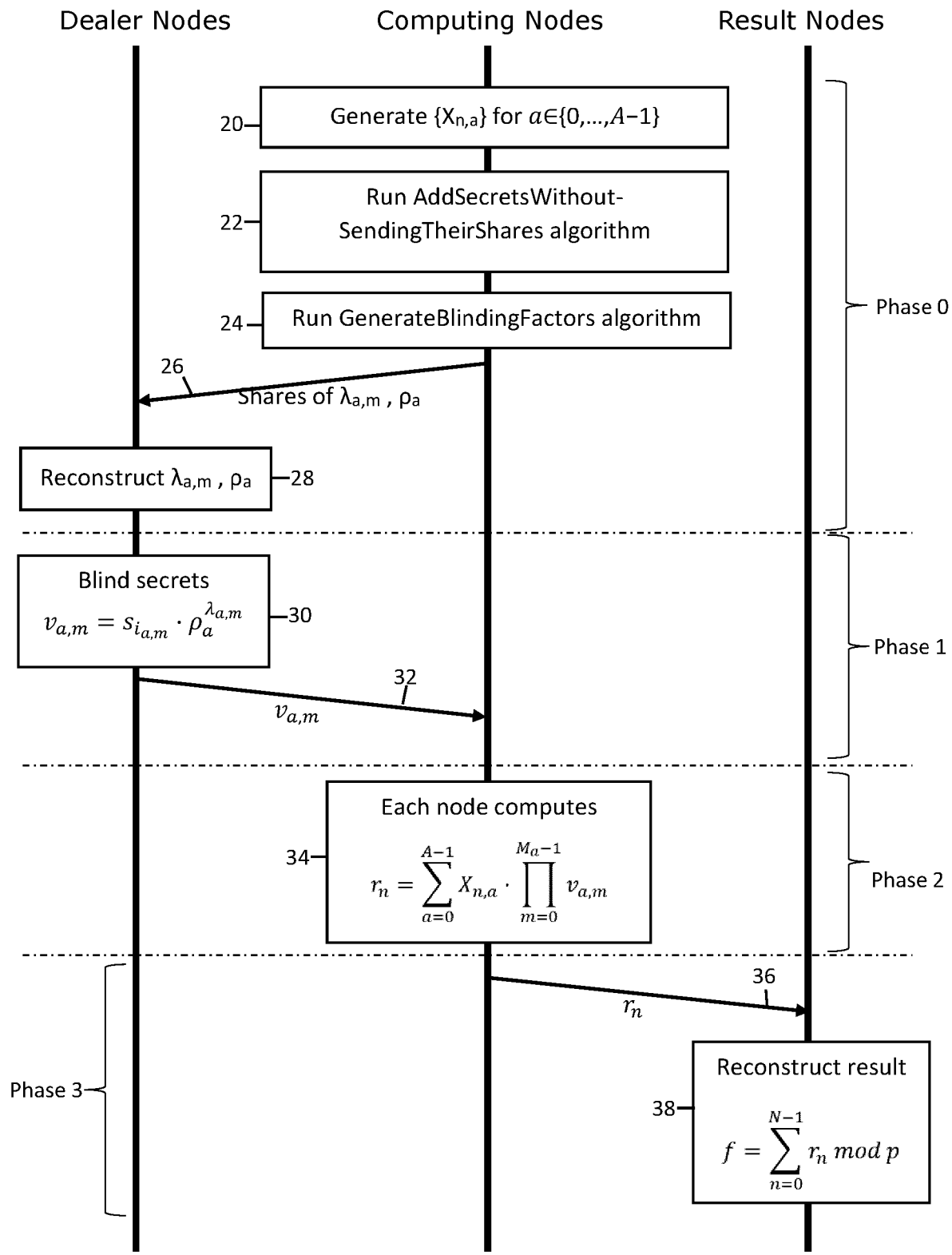
FIG. 3 is a flowchart including message flows, illustrating the Network NMC algorithm.

Referring additionally to FIG. 3, this is a flowchart which includes message flows between the nodes for the Network NMC implementation.

In step 20, each computing node n of the N computing nodes $n \in \{0, 1, \ldots, N-1\}$, generates a random number $X_{n,a}$. This is done in parallel for each addition a, $a \in \{0, 1, \ldots, A-1\}$ as described for Step 1 of Phase 0 above.

In step 22, the computing nodes each run the algorithm AddSecretsWithoutSendingTheirShares using $X_{n,a}$ as their secret input value as described in the first part of Step 2 of Phase 0 above. This results in each computing node having a share of each $\rho_a^{-1}$ which can be sent to the dealer nodes.

In step 24, the computing nodes run GenerateBlindingFactors in parallel in A instances to compute shares of $\lambda_{a,m}$ as described in the first part of Step 3 of Phase 0.

In step 26, the computing nodes send the shares calculated in steps 22 and 24 of FIG. 3 to the dealer nodes as described in the latter parts of Steps 2 and 3 of Phase 0.

In step 28, the dealer nodes reconstruct the blinding factors $\lambda_{a,m}$, $\rho_a$ using Shamir Secret Sharing's polynomial interpolation (e.g. using Lagrange's method). As noted at the end of the description of Phase 0 above, the steps leading to the reconstruction of the blinding factors can be carried out a long time in advance of the share blinding and distribution steps of Phase 1.

It should also be noted that alternative ways of providing the blinding factors are envisaged. For example, in another embodiment, a trusted node carries out the computations from the pre-processing phase and sends $\rho_a^{-1}$ and of $\lambda_{a,m}$ for each addition a, $a \in \{0, 1, \ldots, A-1\}$ to the dealer nodes.

In another embodiment, the N computing nodes carry out the computations from the pre-processing phase using another SMPC flavour different from the one described in algorithm AddSecretsWithoutSendingTheirShares and send messages to the dealer nodes that allow them to reconstruct $\rho_a^{-1}$ and of $\lambda_{a,m}$ for each addition a, $a \in \{0, 1, \ldots, A-1\}$.

In another embodiment, homomorphic encryption is used by one or several nodes, for instance using Full Homomorphic Encryption, or Somewhat Homomorphic Encryption as described in SPDZ (Damgård I., Pastro V., Smart N., Zakarias S. (2012) Multiparty Computation from Somewhat Homomorphic Encryption. In: Safavi-Naini R., Canetti R. (eds) Advances in Cryptology—CRYPTO 2012. CRYPTO 2012. Lecture Notes in Computer Science, vol 7417. Springer, Berlin, Heidelberg. https://doi.org/10.1007/978-3-642-32009-5_38), to carry out the computations from the pre-processing phase and sends $\rho_a^{-1}$ and of $\lambda_{a,m}$ for each addition a, $a \in \{0, 1, \ldots, A-1\}$ to the dealer nodes.

In another embodiment, one or several nodes use secure enclaves or trusted execution environments to carry out the computations from the pre-processing phase and send $\rho_a^{-1}$ and of $\lambda_{a,m}$ for each addition a, $a \in \{0, 1, \ldots, A-1\}$ to the dealer nodes.

Returning to FIG. 3, in step 30, and as is described above in Phase 1, each dealer node 10 may compute $v_{a,m} = s_{i_{a,m}} \cdot \rho_a^{\lambda_{a,m}}$ for the secret $s_{i_{a,m}}$ contributed to the computation of the multiplication comprising the a-th addition term.

In step 32, the result of each such computation is broadcast by the dealer node creating the computation to the computing nodes.

In step 34, and as described above for Phase 2, each computing node calculates a share $r_n$ of the result of the NMC computation, and does so without any communication between the computing nodes.

In step 36, each computing node sends its share $r_n$ to the result nodes.

In step 38, the result nodes reconstruct the result of the function $f$ as the sum of the result shares mod p, according to Eq. 6. It can be shown that this reconstruction, arrived at without any communication between the computing nodes, is indeed a valid result of a multi-party computation of a function in the arithmetic setting by the following proof.

Starting from Eq. 4 and 5 we have (mod p):

$$r_n = \sum_{a=0}^{A-1} r_{n,a}$$

$$= \sum_{a=0}^{A-1} X_{n,a} \cdot \prod_{m=0}^{M_a-1} v_{a,m}$$

$$= \sum_{a=0}^{A-1} X_{n,a} \cdot \prod_{m=0}^{M_a-1} s_{i_{a,m}} \cdot \rho_a^{\lambda_{a,m}}$$

$$= \sum_{a=0}^{A-1} \rho_a^{\lambda_{a,0}} \cdot \rho_a^{\lambda_{a,1}} \cdot \ldots \cdot \rho_a^{\lambda_{a,M_a-1}} \cdot X_{n,a} \cdot \prod_{m=0}^{M_a-1} s_{i_{a,m}}$$

$$= \sum_{a=0}^{A-1} \rho_a^{\lambda_{a,0}+\lambda_{a,1}+\ldots+\lambda_{a,M_a-1}} \cdot X_{n,a} \cdot \prod_{m=0}^{M_a-1} s_{i_{a,m}}$$

$$= \sum_{a=0}^{A-1} \rho_a \cdot X_{n,a} \cdot \prod_{m=0}^{M_a-1} s_{i_{a,m}}$$

where the last step comes from the fact that $\lambda_{a,0} + \lambda_{a,1} + \ldots + \lambda_{a,M_a-1} = 1$, which follows from Eq. 3. By plugging this result into the right-hand side of Eq. 6 we get (mod p):

$$\sum_{n=0}^{N-1} r_n = \sum_{n=0}^{N-1} \sum_{a=0}^{A-1} \rho_a \cdot X_{n,a} \cdot \prod_{m=0}^{M_a-1} s_{i_{a,m}}$$

$$= \sum_{a=0}^{A-1} \sum_{n=0}^{N-1} \rho_a \cdot X_{n,a} \cdot \prod_{m=0}^{M_a-1} s_{i_{a,m}}$$

$$= \sum_{a=0}^{A-1} \rho_a \prod_{m=0}^{M_a-1} s_{i_{a,m}} \cdot \sum_{n=0}^{N-1} X_{n,a}$$

$$= \sum_{a=0}^{A-1} \rho_a \cdot \rho_a^{-1} \prod_{m=0}^{M_a-1} s_{i_{a,m}}$$

$$= \sum_{a=0}^{A-1} \prod_{m=0}^{M_a-1} s_{i_{a,m}}$$

which corresponds to $f = f(s_0, s_1, \ldots, s_{S-1})$ in Eq. 1.

It will be recalled from Assumption 4 that every dealer contributes with at most 1 secret to the product corresponding to the a-th addition term in $f$. In another embodiment, we force every dealer node m to contribute with exactly one secret $s_{i_{a,m}}$ to the product corresponding to the a-th addition term, for every addition term $a \in \{0, 1, \ldots, A-1\}$.

We achieve this as follows: (1) if the dealer was already contributing with one secret to the a-th term, then we do nothing, (2) if the dealer was not contributing with a secret, then it forces its secret to be equal to one: $s_{i_{a,m}} = 1$. This way, the product $\prod_{m=0}^{M_a-1} s_{i_{a,m}}$ in the a-th term is not altered but every dealer node contributes with exactly one secret to it. This allows replacing $M_a = D$ for every addition term a, and making all random vectors $\lambda_{a,m}$ be equal to a single random vector $\lambda_m$, whereby Eq. 3 becomes $$\sum_{m=0}^{D-1} \lambda_m = 1$$

and the same $\lambda_m$ are used for each addition term. This allows a reduction in the amount of information sent by the computing nodes to the dealer nodes at the end of Phase 0. Instead of sending shares for $\rho_a^{-1}$ and $\lambda_{a,m}$, $a \in \{0, 1, \ldots, A-1\}$ and $m \in \{0, 1, \ldots, M_a-1\}$, they just send shares for $\rho_a^{-1}$ and $\lambda_m$, $m \in \{0, 1, \ldots, D-1\}$.

As discussed previously, as an alternative to the Network NMC algorithm the same outcome can be achieved, again without any communication between the computing nodes, using an algorithm referred to as Edge NMC.

We now define the four phases of the Edge NMC SMPC for the joint evaluation of the arithmetic function in Eq. 1 without revealing any input secret value. In Edge NMC SMPC we push most of the complexity in the pre-processing phase to the dealer nodes. This involves changing (relative to the Network NMC algorithm) Steps 1 and 2 in Phase 0, the whole Phase 1 and Step 1 in Phase 2 as follows:

Description of Algorithm Edge NMC

Inputs: As in Network NMC

Output: As in Network NMC

Purpose: As in Network NMC

Phase 0: Pre-Processing
New Step 1 (replacing the old one):
All D dealer nodes run a random number generator in sync. That is, by running it, they independently obtain the same N·A random numbers $X_{n,a}$ without any message exchange, $n \in \{0, 1, \ldots, N-1\}$, $a \in \{0, 1, \ldots, A-1\}$.
New Step 2 (replacing the old one):
Every dealer node $d \in \{0, 1, \ldots, D-1\}$ locally computes:

$$\rho_a^{-1} = \sum_{n=0}^{N-1} X_{n,a}$$

Step 3 remains the same.
The N computing nodes compute the shares of the exponent blinding factors by running GenerateBlindingFactors as described for the Network NMC Algorithm, then reveal the shares of $\{\lambda_{a,m}\}$, $a \in \{0, 1, \ldots, A-1\}$, $m \in \{0, 1, \ldots, M_a-1\}$ to the different dealers allowing them to reconstruct the blinding factor $\lambda_{a,m}$ that hides their secret $s_{i_{a,m}}$.

Phase 1: Share Distribution (Replacing the Old One):
Step 1: Each dealer node $d \in \{0, 1, \ldots, D-1\}$ computes (mod p):

$$v_{n,a,m} = s_{i_{a,m}} \cdot \rho_a^{\lambda_{a,m}} \cdot X_{n,a}$$

for $n \in \{0, 1, \ldots, N-1\}$, $a \in \{0, 1, \ldots, A-1\}$ if they contribute with secret $s_{i_{a,m}}$ to the computation of the multiplication comprising the a-th addition term in Eq. 1. Notice that there are the N shares $v_{0,a,m}, v_{1,a,m}, \ldots, v_{N-1,a,m}$ that correspond to every secret $s_{i_{a,m}}$.

Step 2: Each dealer node $d \in \{0, 1, \ldots, D-1\}$ sends each one of the N shares $v_{0,a,m}, v_{1,a,m}, \ldots, v_{N-1,a,m}$ that correspond to every secret $s_{i_{a,m}}$ owned by node d to a different computing node.

Phase 2: Computation
Step 1 (replacing the old one):
Each computing node n, $n \in \{0, 1, \ldots, N-1\}$ calculates for each addition a, $a \in \{0, 1, \ldots, A-1\}$ (mod p):

$$r_{n,a} = \prod_{m=0}^{M_a-1} v_{n,a,m}, \quad \text{Eq. 4}$$

Step 2: As in Network NMC.
Phase 3—Result Reconstruction
As in Network NMC.

This ends the description of the algorithm Edge NMC.

Figure 4:
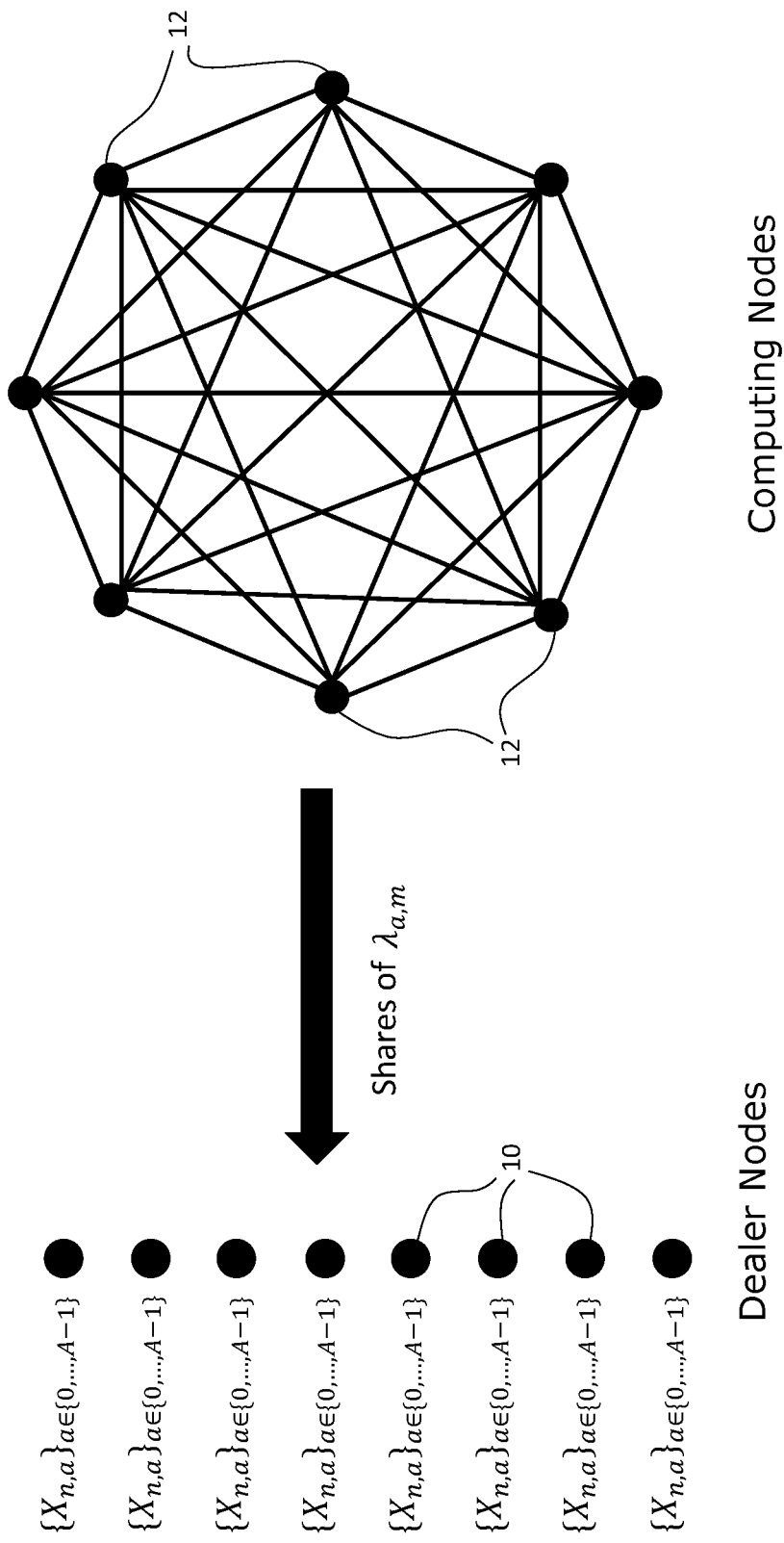
FIG. 4 is a network diagram of the computing nodes and dealer nodes of FIG. 1 implementing the Edge NMC algorithm disclosed herein.

FIG. 4 shows the computing nodes 12 and the dealer nodes 10 from FIG. 1, carrying out the steps of Phase 0—Pre-processing for the Edge NMC implementation.

Figure 5:
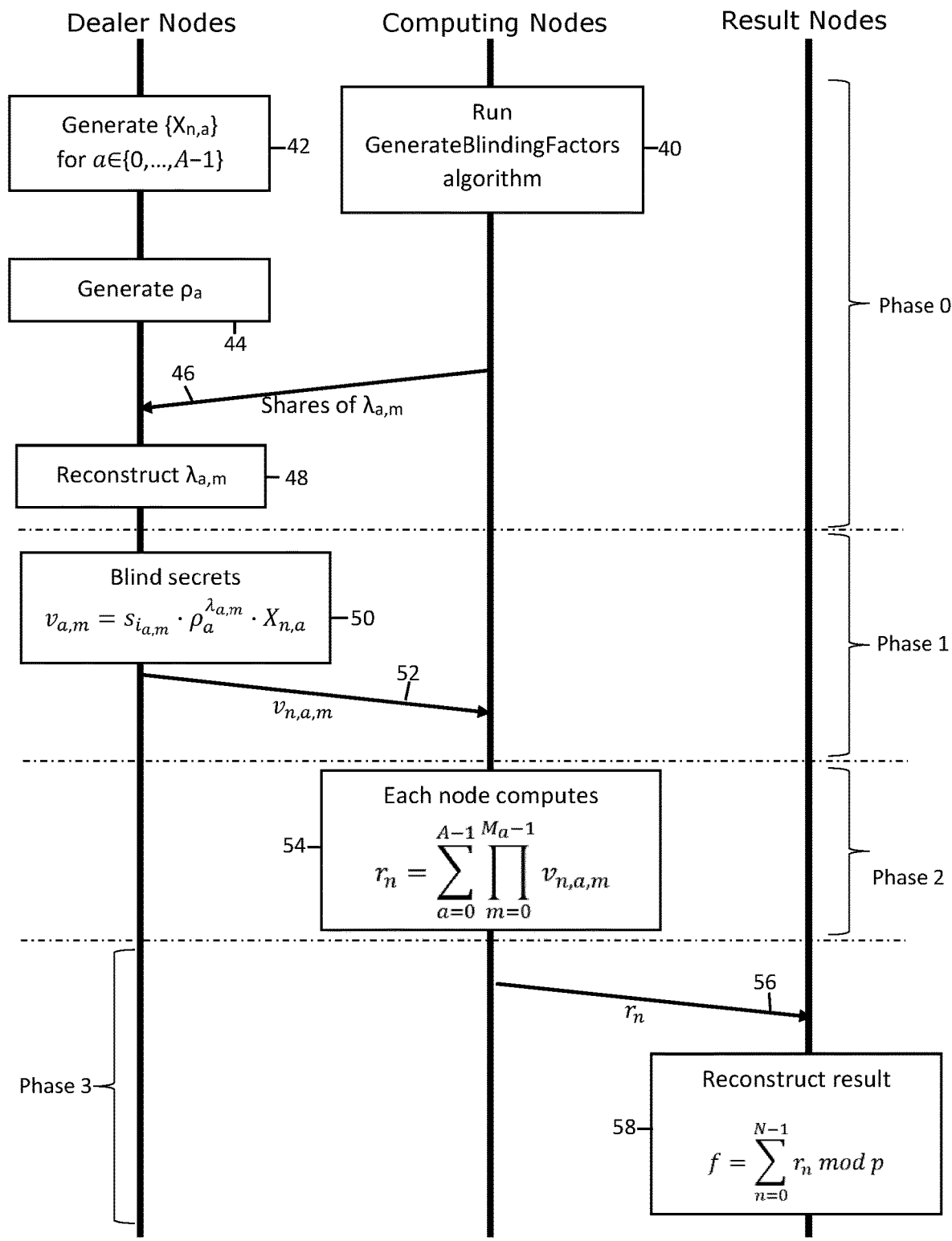
FIG. 5 is a flowchart including message flows, illustrating the Edge NMC algorithm.

Referring additionally to FIG. 5, this is a flowchart which includes message flows between the nodes for the Edge NMC implementation.

In step 40, the computing nodes run GenerateBlindingFactors in parallel in A instances to compute shares of $\lambda_{a,m}$ as described in the first part of Step 3 of Phase 0 of the Edge NMC algorithm above.

In step 42 (which may be carried out before, after or in parallel with step 20), each dealer node runs a random generator in sync to generate the same set of random numbers $X_{n,a}$ without any message exchange, as described in Step 1 of Phase 0.

In step 44, each dealer node locally computes $\rho_a$ (or $\rho^{-1}{}_a$) as set out in Step 2 of Phase 0.

In step 46, the computing nodes send the shares of $\lambda_{a,m}$ calculated in step 40 to the dealer nodes.

In step 48, the dealer nodes reconstruct $\lambda_{a,m}$ from the revealed shares. The skilled person will appreciate that the same options exist for providing the blinding factors to the dealer nodes as in the Network NMC algorithm.

In step 50, as described above in Phase 1, each dealer node 10 computes the N shares $v_{0,a,m}, v_{1,a,m}, \ldots, v_{N-1,a,m}$ that correspond to every secret s as described for Step 1 of Phase 1.

In step 52, these shares are sent to the respective computing nodes as described for Step 2 of Phase 1.

In step 54, the computing nodes calculated the modified version of the result shares $r_n$ according to Phase 2.

In step 56, the result shares are sent to the result nodes, and in step 58, the result nodes reconstruct the result of the function $f$.

The proof for the Edge NMC flavour is almost the same as that for Eq. 6 in the Network NMC flavour, the only difference being that instead of $X_{n,a} \cdot \Pi_{m=0}^{M_a-1} v_{a,m}$ in Edge NMC we have $\Pi_{m=0}^{M_a-1} v_{n,a,m}$. Both are equal since by definition $X_{n,a} \cdot \Pi_{m=0}^{M_a-1} v_{a,m} = X_{n,a} \cdot \Pi_{m=0}^{M_a-1} s_{i_{a,m}} \cdot \rho_a^{\lambda_{a,m}}$ and $\Pi_{m=0}^{M_a-1} v_{n,a,m} = X_{n,a} \cdot \Pi_{m=0}^{M_a-1} s_{i_{a,m}} \cdot \rho_a^{\lambda_{a,m}}$. Sometimes, dealer nodes just want to use the network of computing nodes to store and reconstruct an input secret value. We now discuss this process in both NMC protocols.

In Phase 1 of the Network NMC protocol, a dealer node masks a secret using $v_{a,m} = s_{i_{a,m}} \cdot \rho_a^{\lambda_{a,m}}$ and broadcasts it to the network of computing nodes, whereby each computing node has a share from $\rho_a$ and $\lambda_{a,m}$. When the dealer node wants to reconstruct its secret it requests the network of computing nodes to send their share from $\rho_a$ and $\lambda_{a,m}$ as well as $v_{a,m}$. Using Shamir Secret Sharing, the dealer node reconstructs $\rho_a$ and $\lambda_{a,m}$ and computes its secret input value as follows (mod p): $s_{i_{a,m}} = v_{a,m} \cdot \rho_a^{-\lambda_{a,m}}$.

In Phase 1 of the Edge NMC protocol, a dealer node masks a secret using $v_{n,a,m} = s_{i_{a,m}} \cdot \rho_a^{\lambda_{a,m}} \cdot X_{n,a}$ and broadcasts it to the network of computing nodes, whereby each computing node has a share from $\lambda_{a,m}$. Notice that this does not allow for the reconstruction of the secret input $s_{i_{a,m}}$. We now describe a modification of Phase 1 so that this reconstruction is possible. In the modified version of Phase 1, the dealer uses a linear secret sharing scheme such as Shamir's in order to compute and distribute among the computing nodes the shares from $X_{n,a}$ and $\rho_a$. When the dealer node wants to reconstruct its secret, it requests the network of computing nodes to send their share from $\rho_a$, $X_{n,a}$ and $\lambda_{a,m}$ as well as $v_{n,a,m}$. Using Shamir Secret Sharing, the dealer node reconstructs $\rho_a$, $X_{n,a}$ and $\lambda_{a,m}$ and computes its secret input value as follows (mod p): $s_{i_{a,m}} = v_{n,a,m} \cdot \rho_a^{-\lambda_{a,m}} \cdot X_{n,a}^{-1}$.

The invention claimed is:

1. A computer-implemented method, carried out between a plurality of D dealer nodes and N computing nodes, of calculating the result of an arithmetic function $f$ which can be expressed as the addition of A groups of multiplications of a set S of private input secrets $\{s_0, s_1, \ldots, s_{S-1}\}$ such that:

$$f = f(s_0, s_1, \ldots, s_{S-1}) = m_0 + m_1 + \ldots + m_{A-1} = \sum_{a=0}^{A-1} m_a$$

where each group of multiplications $m_a$, $a \in \{0, 1, \ldots, A-1\}$ is the product of $M_a$ secrets of said set S of private input secrets:

$$m_a = s_{i_{a,0}} \cdot s_{i_{a,1}} \cdot \ldots \cdot s_{i_{a,M_a-1}} = \prod_{m=0}^{M_a-1} s_{i_{a,m}}$$

the subindices $i_{a,m}$ for $a \in \{0, 1, \ldots, A-1\}$, $m \in \{0, 1, \ldots, M_a-1\}$ identify private input secrets from the set of S secrets, where the S secrets are selected from integers, real numbers or complex numbers, each secret is known to one of said dealer nodes, and each computing node operates independently from the other N computing nodes, wherein the method comprises:

a) providing each dealer node contributing a secret $s_{i_{a,m}}$ to a group of multiplications $m_a$ with a base blinding factor $\rho_a$ which is common to all secrets contributing to said group of multiplications $m_a$, wherein the base blinding factor $\rho_a$ satisfies (modulo p, where p is a prime number):

$$\rho_a^{-1} = \sum_{n=0}^{N-1} X_{n,a}$$

for a set of (N×A) random or pseudorandom numbers $X_{n,a}$ for $n \in \{0, 1, \ldots, N-1\}$, $a \in \{0, 1, \ldots, A-1\}$ each associated with a respective one of the N computing nodes;

b) providing each dealer node contributing a secret $s_{i_{a,m}}$ to a group of multiplications $m_a$ with an exponent blinding factor $\lambda_{a,m}$ which is specific to said secret $s_{i_{a,m}}$, wherein the set of exponent blinding factors $\lambda_{a,m}$ collectively satisfy (modulo p):

$$\sum_{m=0}^{M_a-1} \lambda_{a,m} = 1$$

c) storing said set of (N×A) random or pseudorandom numbers $X_{n,a}$ for $n \in \{0, 1, \ldots, N-1\}$, $a \in \{0, 1, \ldots, A-1\}$ either (i) at the computing nodes in a first mode of operation ("network mode") whereby each of the N computing nodes stores a subset of A random or pseudorandom numbers unique to that node, or (ii) at the dealer nodes in a second mode of operation ("edge mode") whereby each dealer node stores at least the subset of the (N×A) random or pseudorandom numbers $X_{n,a}$ corresponding to the additions to which that dealer contributes a secret;

d) each dealer node computing, for each secret $s_{i_{a,m}}$, one or more shares for that secret wherein in the network mode of operation a single share is computed, modulo p, as:

$$v_{a,m} = s_{i_{a,m}} \cdot \rho_a^{\lambda_{a,m}}$$

and wherein in the edge mode of operation a plurality of N shares are computed, using the N random or pseudorandom numbers $X_{n,a}$ associated with the group of multiplications $m_a$ to which the secret $s_{i_{a,m}}$ contributes, modulo p, as:

$$v_{n,a,m} = s_{i_{a,m}} \cdot \rho_a^{\lambda_{a,m}} \cdot X_{n,a}$$

e) each dealer node sending to each of the computing nodes a respective share message which, in the network mode of operation contains the same single share $v_{a,m}$, and in the edge mode of operation contains a respective one of the N shares $v_{n,a,m}$ such that each of the N computing nodes receives the shares indexed to a unique value $n \in \{0, 1, \ldots, N-1\}$;

f) each computing node independently calculating, for the received shares $v_{a,m}$ or $v_{n,a,m}$ associated with each group of multiplications $m_a$, a local product result which in the network mode of operation is calculated, modulo p, as:

$$r_{n,a} = X_{n,a} \prod_{m=0}^{M_a-1} v_{a,m}$$

and which in the edge mode of operation is calculated, modulo p, as:

$$r_{n,a} = \prod_{m=0}^{M_a-1} v_{n,a,m}$$

g) each computing node independently calculating a local addition result from the set of local product results, modulo p, as:

$$r_n = \sum_{a=0}^{A-1} r_{n,a}$$

h) receiving the local addition result from each of the N computing nodes; and i) computing an output of the function $f$ by combining the local addition results from the N computing nodes to compute:

$$f = f(s_0, s_1, \ldots, s_{S-1}) = \sum_{n=0}^{N-1} r_n \bmod p.$$

2. The computer-implemented method of claim 1, wherein step i comprises:

(i) each computing node sending a local addition result $r_n$ to one or more result nodes; and (ii) the one or more result nodes performing the summation of the received local addition results to determine the result of an arithmetic function $f$.

3. The computer implemented method of claim 1, wherein step a) comprises:

(i) each computing node n, $n \in \{0, 1, \ldots, N-1\}$ generating a random number $X_{n,a}$;

(ii) each computing node computing a share $p_a(n+1)$ of a polynomial $p_a(x)$ of degree N−1 such that (mod p):

$$\rho_a^{-1} = p_a(0) = \sum_{n=0}^{N-1} X_{n,a}$$

(iii) each computing node sending its share of each $\rho_a^{-1}$ to each dealer node d, $d \in \{0, 1, \ldots, D-1\}$; and (iv) each dealer node reconstructing from the received shares the corresponding base blinding factor $\rho_a^{-1}$.

4. The computer implemented method of claim 3, wherein step (ii) comprises:

providing a collection of random number generators $G_{n,q}$ for n, $q \in \{0, \ldots, N-1\}$ with $n \neq q$, such that $G_{n,q}$ is a generator that computing nodes n and q run in sync with one another;

each computing node n generating N−1 random shares from the random number generators $G_{n,q}$ for each $q \in \{0, \ldots, N-1\}$, with $q \neq n$ to generate a respective random evaluation of a polynomial $p_n(q+1)$;

each computing node n computing the coefficients of the polynomial $p_n(x)$ which satisfies each of the random evaluations $p_n(q+1)$ and satisfies $p_n(0)=X_{n,a}$;

each computing node n computing from said coefficients and $X_{n,a}$ a share $p_n(n+1)$ of the polynomial $p_n(x)$;

each computing node n generating $p_q(n+1)$ from the random number generators $G_{n,q}$ for each $q \in \{0, \ldots, N-1\}$, as its own share of the polynomial $p_q(x)$ from every other computing node q;

each node computing $\Sigma_{q=0}^{N-1} p_q(n+1) \bmod p$ to provide a share $p(n+1)$ of the polynomial $p_a(x)$ evaluated at $n+1$; and each computing node sending its share $p(n+1)$ of $p_a(x)$ each dealer node contributing to the group of multiplications $m_a$ such that each dealer node can reconstruct the independent coefficient of $p_a(x)$ corresponding to $x^0$, which is which is equal to the sum of the secrets $$\rho_a^{-1} = \Sigma_{n=0}^{N-1} X_{n,a}.$$

5. The computer implemented method of claim 1, wherein step a) comprises one of:

a. the dealer nodes receiving the base blinding factor $\rho_a^{-1}$ from a trusted node;

b. the computing nodes sending messages to the dealer nodes permitting then to reconstruct $\rho_a^{-1}$ for each addition a, $a \in \{0, 1, \ldots, A-1\}$, said messages being collaboratively generated by the dealer nodes from the secrets $X_{n,a}$ using a secure multiparty computation;

c. one or more nodes other than the dealer nodes performing a homomorphic encryption to generate the base blinding factor $\rho_a^{-1}$, and sending this base blinding factor to the dealer nodes contributing to the addition a; or d. one or more nodes other than the dealer nodes computing the base blinding factor $\rho_a^{-1}$ in a secure enclave or trusted execution environment, and sending the base blinding factor to the dealer nodes contributing to the addition a.

6. The computer implemented method of claim 2, wherein step a) comprises:

(i) each computing node n, $n \in \{0, 1, \ldots, N-1\}$ generating a random number $X_{n,a}$;

(ii) each computing node computing a share $p_a(n+1)$ of a polynomial $p_a(x)$ of degree N−1 such that (mod p):

$$\rho_a^{-1} = p_a(0) = \sum_{n=0}^{N-1} X_{n,a}$$

(iii) each computing node sending its share of each $\rho_a^{-1}$ to each dealer node d, d∈{0, 1, . . . , D−1}; and (iv) each dealer node reconstructing from the received shares the corresponding base blinding factor $\rho_a^{-1}$.

7. The computer implemented method of claim 2, wherein step a) comprises one of:
   a. the dealer nodes receiving the base blinding factor $\rho_a^{-1}$ from a trusted node;
   b. the computing nodes sending messages to the dealer nodes permitting then to reconstruct $\rho_a^{-1}$ for each addition a, a∈{0, 1, . . . , A−1}, said messages being collaboratively generated by the dealer nodes from the secrets $X_{n,a}$ using a secure multiparty computation;
   c. one or more nodes other than the dealer nodes performing a homomorphic encryption to generate the base blinding factor $\rho_a^{-1}$, and sending this base blinding factor to the dealer nodes contributing to the addition a, or
   d. one or more nodes other than the dealer nodes computing the base blinding factor $\rho_a^{-1}$ in a secure enclave or trusted execution environment, and sending the base blinding factor to the dealer nodes contributing to the addition a.

8. A secure multiparty computation method for performing a computation using a set of private input secrets, wherein each of D dealer nodes stores a respective secret in the set of private input secrets, comprising:

providing each dealer node with a base blinding factor $\rho_a$ having an inverse that is a sum of a set of pseudorandom numbers, wherein each base blinding factor $\rho_a$ is associated with a respective computing node and is not shared with other computing nodes, wherein the base blinding factor $\rho_a$ is common to all secrets in the set of private input secrets;

providing each dealer node with an exponent blinding factor $\lambda_{a,m}$ specific to its respective private input secret, wherein all the exponent blinding factors sum to unity;

sharing, by each dealer node to respective nodes of N computing nodes, the product of the secrets with the base blinding factor raised to the exponent blinding factor;

generating, by each computing node independently and without sharing computations with other computing nodes, a result share from a product of shares received by the each computing node from the dealer nodes;

receiving, from each computing node, the result share; and constructing a computation result while maintaining secrecy of each dealer node's secret by summing the received result shares.

* * * * *